US 6,757,727 B1

(12) United States Patent
Ivory (10) Patent No.: US 6,757,727 B1
(45) Date of Patent: Jun. 29, 2004

(54) TOP-DOWN NETWORK ANALYSIS SYSTEM AND METHOD WITH ADAPTIVE FILTERING CAPABILITIES

(75) Inventor: Christopher J. Ivory, Glen Rock, NJ (US)

(73) Assignee: Networks Associates Technology, Inc., Santa Clara, CA (US)

( * ) Notice: Subject to any disclaimer, the term of this patent is extended or adjusted under 35 U.S.C. 154(b) by 313 days.

(21) Appl. No.: 09/968,555

(22) Filed: Sep. 28, 2001

(51) Int. Cl.[7] .............................................. G06F 15/173
(52) U.S. Cl. ........................... 709/224; 709/223; 714/4; 345/736; 370/242; 370/252
(58) Field of Search ................................ 709/223, 224; 370/235, 252, 253, 242, 245, 469; 714/1, 4; 345/736

(56) References Cited

U.S. PATENT DOCUMENTS

| | | | | |
|---|---|---|---|---|
| 5,220,163 | A | | 6/1993 | Toughlian et al. ........ 250/201.9 |
| 5,787,253 | A | * | 7/1998 | McCreery et al. .......... 709/231 |
| 5,850,388 | A | * | 12/1998 | Anderson et al. ........... 370/252 |
| 5,877,954 | A | | 3/1999 | Klimasauskas et al. ..... 364/149 |
| 6,041,347 | A | * | 3/2000 | Harsham et al. ............ 709/220 |
| 6,115,393 | A | * | 9/2000 | Engel et al. ................. 370/469 |
| 6,278,962 | B1 | | 8/2001 | Klimasauskas et al. ........ 703/13 |
| 6,282,247 | B1 | | 8/2001 | Shen .......................... 375/285 |
| 6,321,263 | B1 | * | 11/2001 | Luzzi et al. ................. 709/224 |
| 6,327,620 | B1 | * | 12/2001 | Tams et al. .................. 709/224 |
| 6,483,814 | B1 | | 11/2002 | Hsu et al. .................... 370/277 |
| 6,484,203 | B1 | * | 11/2002 | Porras et al. ................ 709/224 |
| 6,526,044 | B1 | * | 2/2003 | Cookmeyer et al. ........ 370/352 |
| 6,541,893 | B2 | | 4/2003 | Zhu et al. ................ 310/313 B |
| 6,608,817 | B1 | * | 8/2003 | Ivory .......................... 370/250 |
| 6,639,607 | B1 | * | 10/2003 | Ferguson et al. ............ 345/734 |
| 2001/0025232 | A1 | | 9/2001 | Klimasauskas et al. ....... 703/13 |
| 2001/0039579 | A1 | * | 11/2001 | Trcka et al. ................. 709/224 |
| 2002/0047494 | A1 | | 4/2002 | Zhu et al. ................ 310/313 B |
| 2002/0087882 | A1 | * | 7/2002 | Schneier et al. ............. 713/201 |
| 2002/0112182 | A1 | * | 8/2002 | Chang et al. ................ 713/201 |
| 2002/0133588 | A1 | * | 9/2002 | Doyle et al. ................. 709/224 |
| 2003/0135612 | A1 | * | 7/2003 | Huntington et al. ........ 709/224 |

FOREIGN PATENT DOCUMENTS

WO 01/15360 A1 3/2001 ............. H04J/1/12

OTHER PUBLICATIONS

Held, "EtherPeek—Ethernet Network Analysis Software," 1998, International Journal of Network Management, 8, pp. 318–322.*
AG Group—products/etherpeek/details, from http://www-.baglan.com.tr/urunler/aggroup/details.htm, pp. 1–9, as printed, date unknown.*
Wildpackets, "EtherPeek NX, Ten Cool Things," 2002, WildPackets, Inc., from www.wildpackets.com, pp. 1–14.*
AG Group, "Etherpeek, Ethernet Protocol Analyzer & Packet Debugger," 1999, AG Group, Inc., pp. 1–4.*

(List continued on next page.)

Primary Examiner—Glenton B. Burgess
Assistant Examiner—Bradley Edelman
(74) Attorney, Agent, or Firm—Silicon Valley IP Group, PC; Kevin J. Zilka; Christopher J. Hamaty (57) ABSTRACT

A system, method and computer program product are provided for filtering communications over a network. Initially, a user is allowed to select from a plurality of network communication protocol layers associated with communications over a network. This may be accomplished in any manner such as allowing the user to select from the layers themselves, various faults that are inherent to certain layers, etc. An adaptive filter is then generated which is capable of collecting communications only involving the selected network communication protocol layers based on the user selection. Such adaptive filter is then used to collect the communications involving the selected network communication protocol layers. Further, an analysis process is executed for analyzing information at the selected network communication protocol layers of the collected communications for the detection of faults therein.

3 Claims, 7 Drawing Sheets

OTHER PUBLICATIONS

Muller, Focus On OpenView, 1995, CBM Books, pp. 97–118.*

Green, "Sniffer Portable Analysis Suite 3.5," May 2000, from http://www.winnetmag.com/Articles/Print.cfm?ArticleID=8482, printout pp. 1–7.*

Bannan, "Sniff Out Trouble," May 22, 2001, PC Magazine Online, from http://www.pcmag.com/print_article/0,3048,a=3132,00.asp, printout pp. 1–8.*

Network Associates, "Total Network Visibility, Sniffer Pro WAN Network Analyzer," Jun. 1999, Network Associates, pp. 1–2.*

Sniffer Technologies, "Sniffer Pro LAN Network Analyzer," Jun. 2000, Sniffer Technologies, pp. 1–2.*

Network Instruments, "Observer's Advanced and RMON Probe," 1999, Network Instruments, pp. 1–2.*

Bardwell, "Assessing Wireless Security With AiroPeek," Jun. 18, 2001, from www.airopeek.de/AiroPeek_Security.pdf, pp. 1–4.*

WildPackets, "WildPackets Launches EtherPeek NX," Oct. 31, 2001, from http://www.wildpackets.com/corporate/news/01–10–31, printout pp. 1–2.*

* cited by examiner

TOP-DOWN NETWORK ANALYSIS SYSTEM AND METHOD WITH ADAPTIVE FILTERING CAPABILITIES

FIELD OF THE INVENTION

The present invention relates to network analyzers, and more particularly to filtering and analyzing network communications utilizing a network analyzer.

BACKGROUND OF THE INVENTION

Open Systems Interconnection (OSI) (a.k.a. ISO) is a standard description for how messages are transmitted between any two points on a network. The purpose of the description is to guide designers of products so that such products will consistently work with other products. The reference model defines seven layers of functions that take place at each end of a communication. Although OSI is not always strictly adhered to in terms of keeping related functions together in a well-defined layer, many if not most products involved in telecommunications use the OSI model.

By this design, the process of communication between two end points in a telecommunication network can be divided into layers, with each layer adding its own set of related functions. Each communicating user is at a computer equipped with these seven layers of function. In a given message between users, there is a flow of data through each layer in a transmitting computer at one end and, at the other end, when the message arrives, another flow of data through the layers in a receiving computer. The actual programming and hardware that furnishes these seven layers of function is usually a combination of the computer operating system, applications (such as a Web browser), TCP/IP or alternative transport and network protocols, and the software and hardware that enable one to put a signal on one of the lines attached to a computer.

Figure 1:
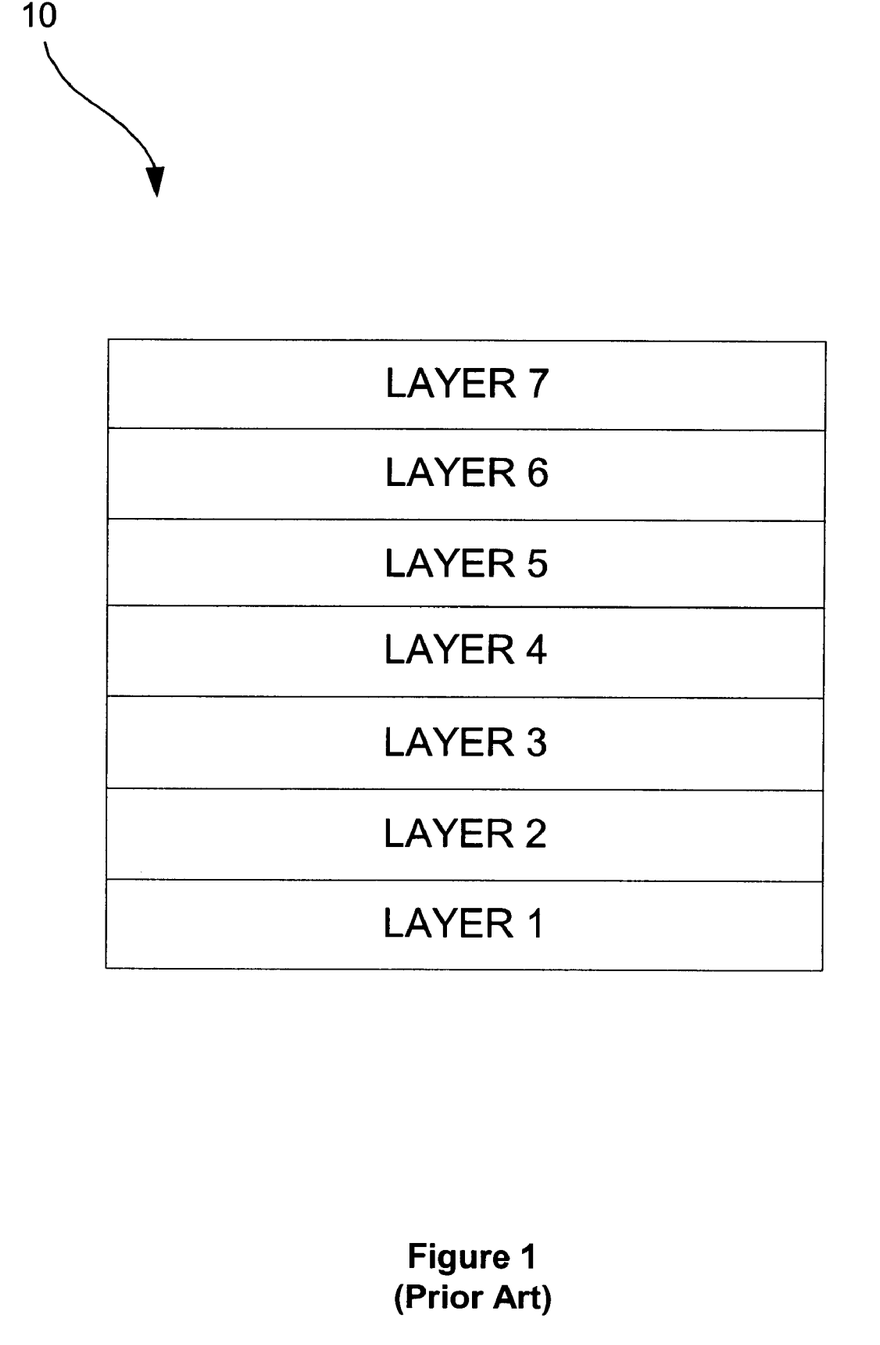
FIG. 1 illustrates the seven Open Systems Interconnection (OSI) standard layers.

Prior art FIG. 1 illustrates the seven OSI standard layers 10. As shown, the OSI reference model defines seven layers of functions that take place at each end of a communication.

The layers may be categorized in two groups. The upper four layers are used whenever a message passes from or to a user. The lower three layers (up to the "network layer" i.e. Layer 3) are used when any message passes through the host computer. Messages intended for the host computer pass to the upper layers. Messages destined for some other host are not passed up to the upper layers, but rather forwarded to another host. Table 1 sets forth the seven layers, and a short description thereof.

TABLE 1

Layer 7: The application layer - This is the layer at which communication partners are identified, quality of service is identified, user authentication and privacy are considered, and any constraints on data syntax are identified.
Layer 6: The presentation layer - This is a layer, usually part of an operating system, that converts incoming and outgoing data from one presentation format to another (for example, from a text stream into a popup window with the newly arrived text). It is sometimes called the syntax layer.
Layer 5: The session layer - This layer sets up, coordinates, and terminates conversations, exchanges, and dialogs between the applications at each end. It deals with session and connection coordination.
Layer 4: The transport layer - This layer manages the end-to-end control and error-checking. It ensures complete data transfer.

TABLE 1-continued

Layer 3: The network layer - This layer handles the routing of the data. The network layer performs routing and forwarding.
Layer 2: The data-link layer - This layer provides synchronization for the physical level and does bit-stuffing for strings of 1's in excess of 5. It furnishes transmission protocol knowledge and management.
Layer 1: The physical layer - This layer conveys the bit stream through the network at the electrical and mechanical level. It provides the hardware means of sending and receiving data on a carrier.

Network assessment tools referred to as "analyzers" are often relied upon to analyze networks communications at each of the foregoing layers. One example of such analyzers is the SNIFFER ANALYZER™ device manufactured by NETWORK ASSOCIATES, INC™. All analyzers have similar objectives such as determining why network performance is slow, understanding the specifics about excessive traffic, and/or gaining visibility into various parts of the network.

The SNIFFER ANALYZER™ device analyzes many layers of network protocols. Although the user can provide some amount of filtering to focus in on a particular problem at hand, the creation of such filters is complicated and does not adapt to the problems detected in the network. This causes more analysis to be provided than needed to detect and solve the network problems, which translates into a greater need for memory and CPU cycles (bandwidth) to provide such processing. Moreover, since the analyzer system processes network communications from the bottom layers to the top layers, the analysis must traverse many layers and encounter an enormous amount of processing.

The end result is that the analysis system may not be able to keep up with the analysis, and is forced to ignore what could be relevant network conversations due to bandwidth starvation. In addition, due to the lack of precision filtering capability, more conversations than required result in unneeded analysis, which in turn starves the analysis system of resources.

There is thus a need for technique of more efficiently analyzing network communications, while still focusing on the correct network communications.

DISCLOSURE OF THE INVENTION

A system, method and computer program product are provided for filtering communications over a network. Initially, a user is allowed to select from a plurality of network communication protocol layers associated with communications over a network. This may be accomplished in any manner such as allowing the user to select from the layers themselves, various faults that are inherent to certain layers, etc. An adaptive filter is then generated which is capable of collecting communications only involving the selected network communication protocol layers based on the user selection. Such adaptive filter is then used to collect the communications involving the selected network communication protocol layers. Further, an analysis process is executed for analyzing information at the selected network communication protocol layers of the collected communications for the detection of faults therein.

In one embodiment, the user may be allowed to select from a plurality of faults associated with the communications over the network. Further, a probe may be generated for analyzing the collected communications for the selected faults. It should be noted that the collected communications are then analyzed only for the selected faults utilizing a plurality of the probes which are capable of being utilized by the analysis process. Moreover, the adaptive filter may be stored for use at a later time.

As an option, the user may be allowed to select the network communication protocol layers and the faults utilizing a graphical user interface. Such graphical user interface may be adapted for allowing a user to select from a plurality of network communication protocol layers associated with the communications over the network. Further, the graphical user interface may be adapted for allowing the user to select from a plurality of faults associated with the communications over the network. In use, the adaptive filter and the probe are capable of being constructed based on the user selections.

During the analysis process, it may be determined that a problem exists at a lower one of the network communication protocol layers. If such problem exists, an additional analysis process may be initiated for analyzing information at the lower network communication protocol layer of the collected communications for the detection of faults.

Still yet, an additional adaptive filter may be generated. Such additional adaptive filters may be used to collect the communications associated with the lower network communication protocol layer for analysis by the additional analysis process. In a similar manner, an additional probe may be generated for analyzing the collected communications for faults associated with the lower network communication protocol layer. By this feature, the communications filtered by the additional adaptive filter may be analyzed for faults utilizing the additional probe during the additional analysis process.

In another embodiment, the analysis process(es) may involve matching bit patterns with the collected communications. Further, an alarm event may be executed based on the analysis process.

Also provided is a system, method and computer program product for top-down analysis of communications over a network. Initially, a plurality of predetermined network communication protocol layers of collected communications are analyzed. Further, it is determined whether a problem exists at a lower one of the network communication protocol layers. If it is determined that a problem exists at the lower network communication protocol layer, an additional analysis process may then be executed for analyzing the lower network communication protocol layer of the collected communications. An efficiency of the analysis is thus improved by avoiding the additional analysis process when it is unnecessary.

By this design, a user is given several options on which to focus an analysis. First, a user may select a given network layer and, more specifically, a given network protocol at which to start analysis. The user can then monitor a complete set of possible issues at a given layer, focus on a given protocol on the layer, and/or narrow the analysis down to a set of one or more problems detectable in a given protocol on a given layer. Having defined the focus of the analysis, the present embodiment then analyzes the network data stream and if any selected issues are detected, a warning is issued to the user. If the detected problem is a symptom of an underlying cause at a lower layer, the analysis expands automatically via the use of adaptive filters to detect such underlying causes in the other layers. This process may be continued until the root cause of the fault is detected.

BRIEF DESCRIPTION OF THE DRAWINGS

Prior art

DESCRIPTION OF THE PREFERRED EMBODIMENTS

Figure 1A:
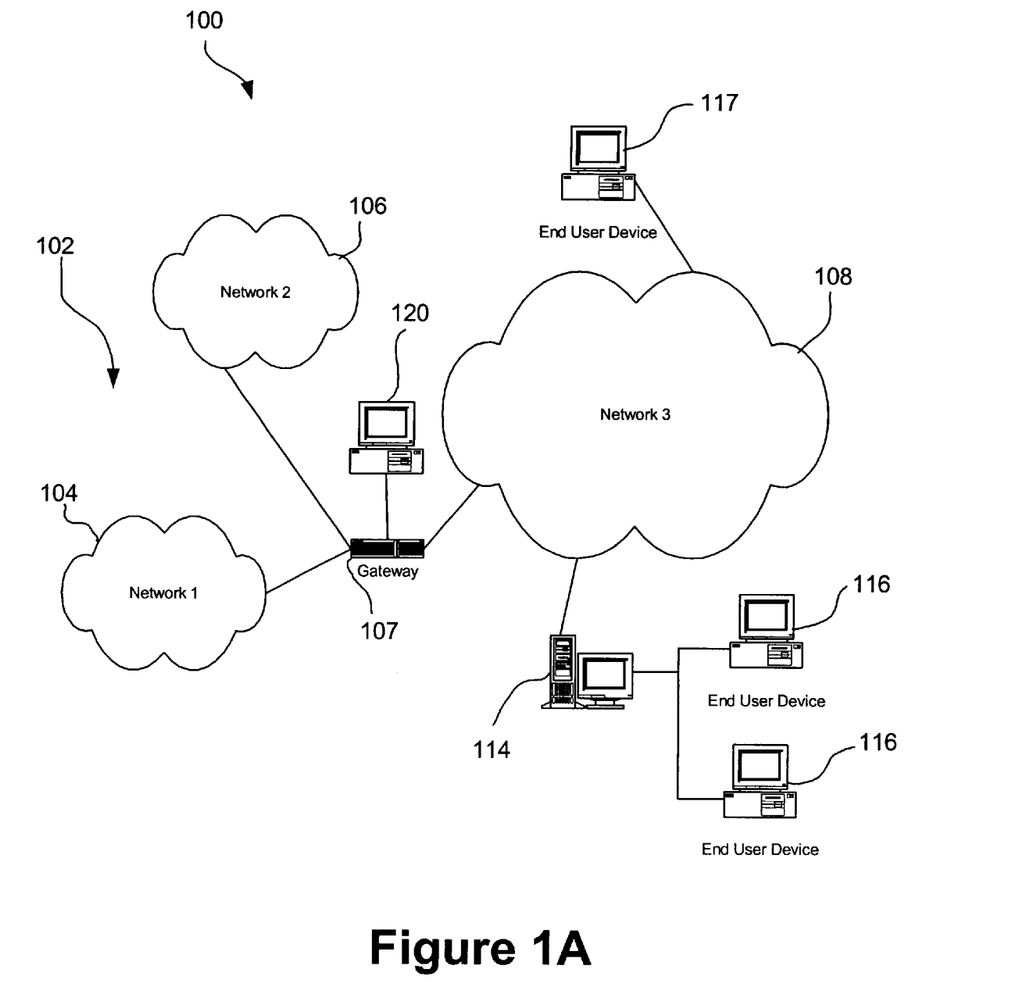
FIG. 1A illustrates a network architecture, in accordance with one embodiment.

FIG. 1A illustrates a network architecture 100, in accordance with one embodiment. As shown, a plurality of networks 102 are provided including a first network 104 and a second network 106. Also included is at least one gateway 107 coupled between the networks 102 and a third network 108. In the context of the present network architecture 100, the networks 104, 106, 108 may each take any form including, but not limited to a local area network (LAN), a wide area network (WAN) such as the Internet, etc. Further, any number of networks may be included.

In use, the gateway 107 serves as an entrance point from the networks 102 to the third network 108. As such, the gateway 107 may function as a router, which is capable of directing a given packet of data that arrives at the gateway 107, and a switch, which furnishes the actual path in and out of the gateway 107 for a given packet.

Further included is at least one server 114 coupled to the third network 108, and which is accessible from the networks 102 via the gateway 107. It should be noted that the server(s) 114 may include any type of computing device/groupware. Coupled to each server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

Further provided is at least one analyzer (not shown) that may be installed on the gateway 107 in a computer 120 or any one of the network components shown in FIG. 1A. As an option, such analyzer(s) may take the form of the SNIFFER ANALYZER™ device manufactured by NETWORK ASSOCIATES, INC™. Of course, any other type of analyzer may be used for determining why network performance is slow, understanding the specifics about excessive traffic, and/or gaining visibility into various parts of the network. More information on such analyzer will be set forth in greater detail during reference to FIG. 4.

Figure 2:
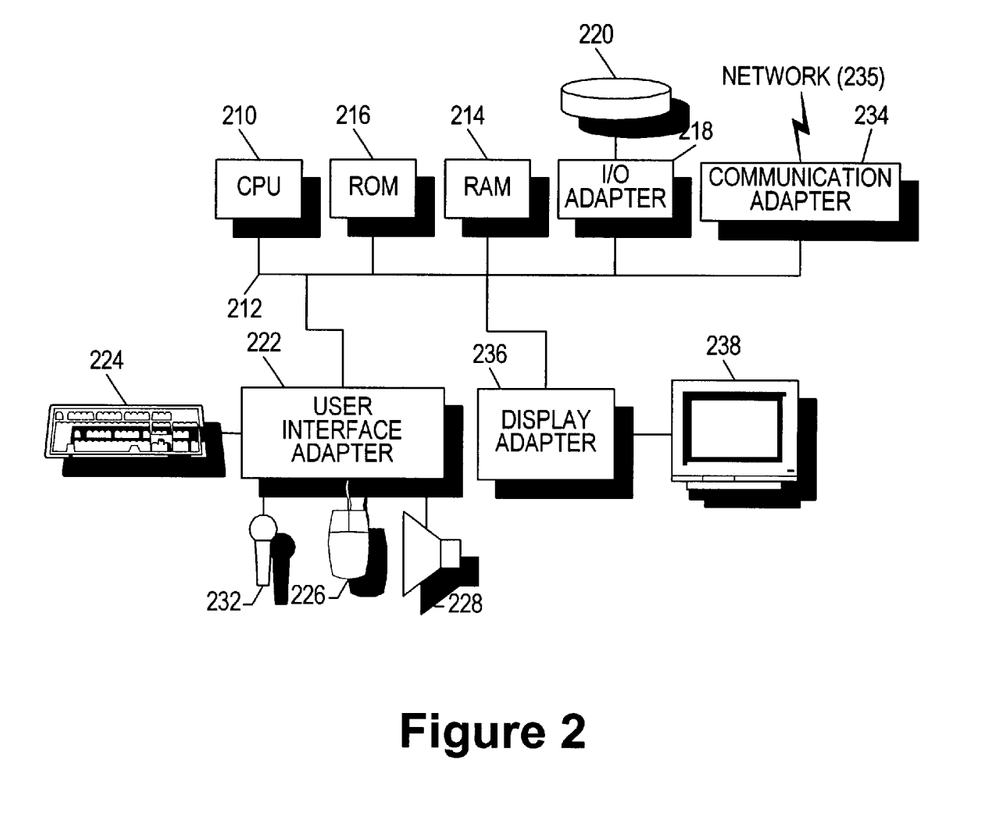
FIG. 2 shows a representative hardware environment that may be associated with the various network components of FIG. 1A, in accordance with one embodiment.

FIG. 2 shows a representative hardware environment that may be associated with the data servers 114, end user computers 116, and/or computer 120, of FIG. 1A, in accordance with one embodiment. Such figure illustrates a typical hardware configuration in accordance with a preferred embodiment having a central processing unit 210, such as a microprocessor, and a number of other units interconnected via a system bus 212.

The present hardware shown in FIG. 2 includes a Random Access Memory (RAM) 214, Read Only Memory (ROM)

216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, a communication adapter 234 for connecting the present hardware to a communication network 235 (e.g., a data processing network) and a display adapter 236 for connecting the bus 212 to a display device 238. It should be noted that the present hardware is set forth for illustrative purposes only, and should not be construed as limiting in any manner.

The present hardware may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
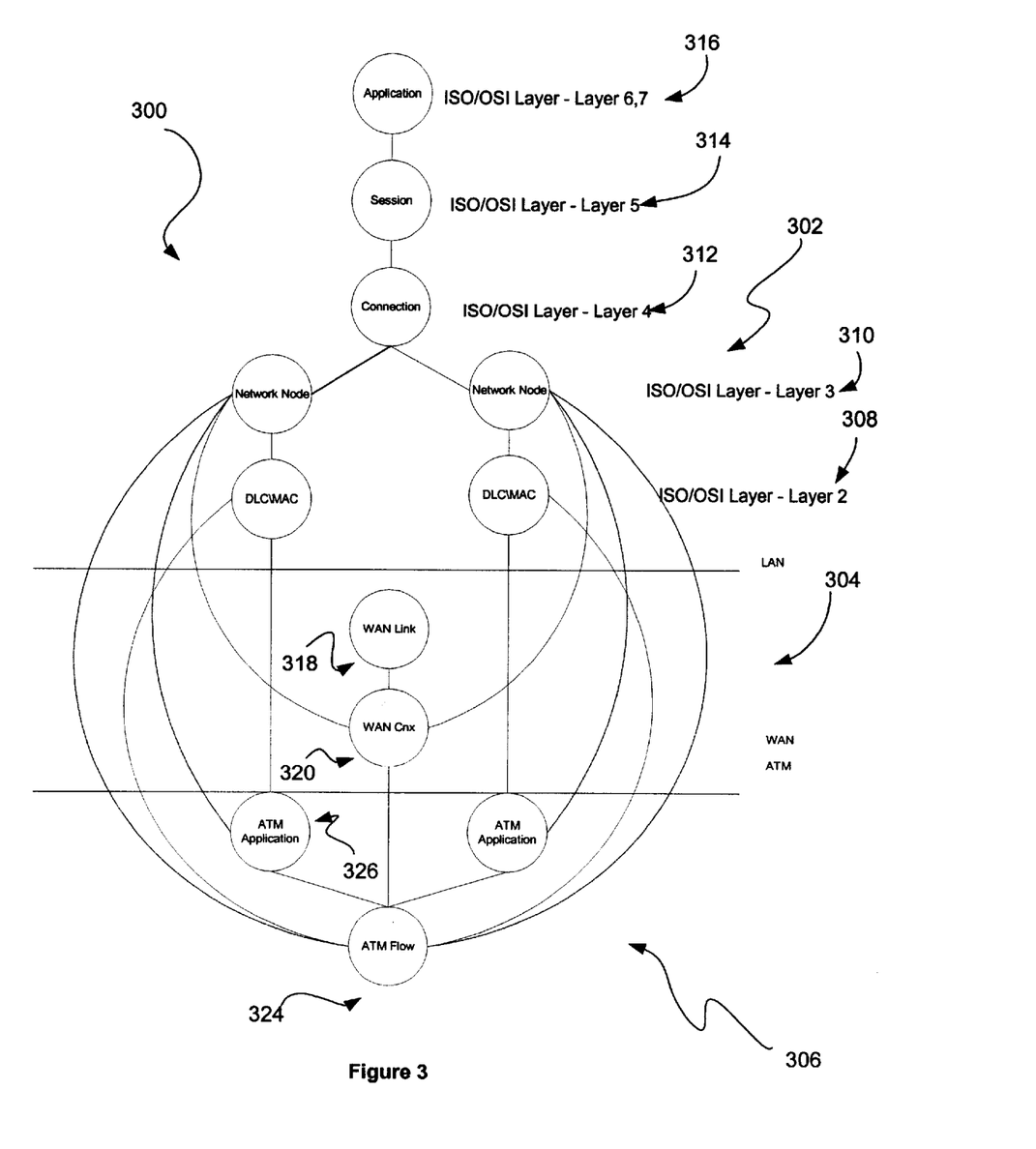
FIG. 3 depicts one exemplary modified OSI model that may be used in the context of an analyzer.

FIG. 3 depicts one exemplary modified Open Systems Interconnection (OSI) model 300 that may be used in the context of the aforementioned analyzer. It should be noted that the present embodiment may be used in the context of any model 300, per the desires of the user. As shown, a LAN layer 302 and a WAN layer 304 are provided. Further, asynchronous transfer mode (ATM) layers 306 link to the upper LAN and WAN layers 302 & 304. While not shown, various other ATM layers 306 may be provided per the desires of the user.

Included are five LAN layers 302 including a data link control (DLC)/media access control (MAC) layer 308 (Layer 2), a Netnode layer 310 (Layer 3), a connection layer 312 (Layer 4), a session layer 314 (Layer 5), and an application layer 308 (Layer 6/7) that combines OSI application and presentation layers. See Table 1.

As shown in FIG. 3, two WAN layers 304 may be included for WAN support. Such WAN layers 304 include a call layer 320 (Layer W1), and a link layer 318 (Layer W2). The WAN layers 304 are used to support frame relay and high-level data link control (HDLC) streams that may carry encapsulated LAN layer 302 protocols. To accomplish this, the WAN layers 304 are positioned below the LAN layers 302 in the analyzer.

The ATM layers 306 may also be defined. While not all are shown, there are eight ATM layers 306 including a subhost layer (Layer A1), a host layer (Layer A2), a PNNI node layer (Layer A3), a PNNI link layer (Layer A4), a sub-connection layer (Layer A5), a connection layer (Layer A6), a flow layer 324 (Layer A7), and an application layer 326 (Layer A8). Since the ATM layers 306 can carry both LAN and WAN data streams, the ATM layers 306 are positioned below both the LAN and WAN portion of the model 300 and likewise feed up into such portion when ATM is carrying such data.

The many interconnects shown in FIG. 3 serve to illustrate that there is a great deal of processing that must be performed utilizing prior art analyzer devices. In some cases, many layers that must be traversed to completely process a LAN, WAN or ATM frame. In the context of the present description, a frame includes a component of network communications. In a worst case scenario, there may be Ethernet- or Token Ring Protocol-based frames that are encapsulated in ATM protocol frames. Since prior art analyzer systems process such a frame from the bottom layers to the top layers, the frame must traverse many layers and encounter an enormous amount of processing. While a multitude of protocol violations may occur and likewise be detected by the analyzer system, a major drawback is that a great deal of CPU processing resources must be brought to bear for such an analysis. As such, the analysis system is unlikely to keep pace. It should be noted that each frame that enters the analyzer system must be processed before the next frame. In the case of high bandwidth networks (i.e. ATM, Gigabit Ethernet, SONET, etc), it is likely to be impossible to find all problems all of the time.

The analyzer of the present embodiment solves such problem using user-configured probes and adaptive filters to maintain the desired depth of analysis while reducing per-frame processing requirements, and removing clutter caused by a plethora of alarm conditions (symptoms and diagnosis) that a user does not care to see.

Figure 4:
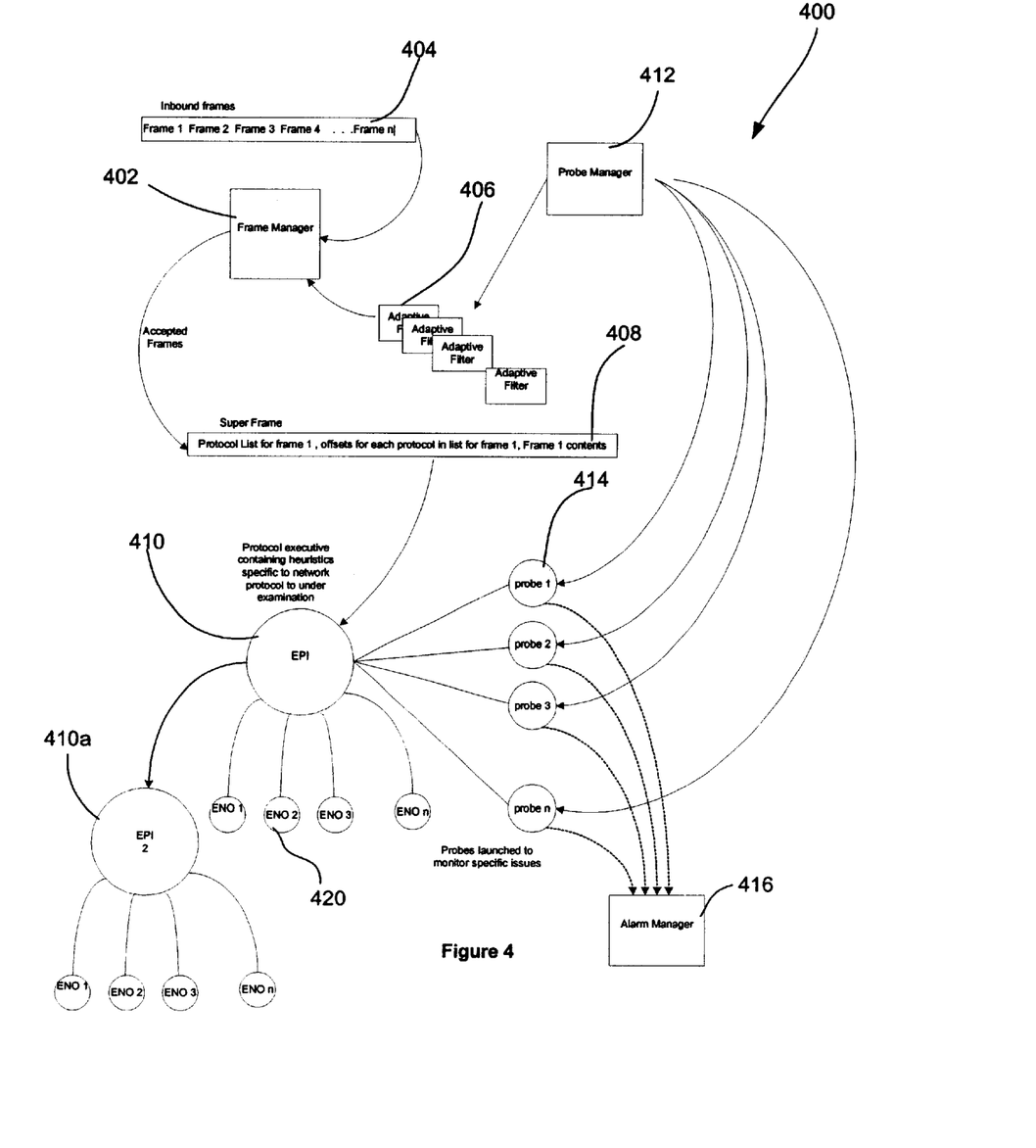
FIG. 4 illustrates an analyzer system with adaptive filtering and top-down analysis capabilities, in accordance with one embodiment.

FIG. 4 illustrates an analyzer system 400 capable of accomplishing the foregoing objectives, in accordance with one embodiment. It should be noted that the exact configuration of the analyzer system 400 may take any form capable of accomplishing the foregoing objectives, and more particularly, carrying out the functionality to be set forth in greater detail during reference to FIG. 6.

First provided is a frame manager 402 which constitutes the ingress point for the system 400. As shown, a flow of frames 404 is received by the frame manger 402. The role of the frame manager 402 is several-fold. In particular, the frame manager 402 parses the incoming frame, and builds a list of all LAN\WAN\Broadband protocols and encapsulations that exist in the frame. Thereafter, a current frame filter mask (as provided by a combination of adaptive filters 406) is used to accept or reject the frame.

Rejection of the frame case means that no additional processing of the frame takes place even though it may (or may not) be held in a capture buffer of the system 400. On the other hand, accepted frames are used to create a "super context sensitive frame" 408 containing the current frame protocol list as a header followed by the contents of the original inbound frame. As such, frames may be directed to a target Expert Protocol Interpreter 410 for further processing. It should be noted that the target Expert Protocol Interpreter 410 is indicated as part of the data set which makes up the adaptive filter 406 used in the frame selection process.

Also provided is a probe manager 412 which serves as a control center for generation and launching of probes 414 and adaptive filters 406. As will soon become apparent, the probe manager 412 accepts user input in the form of anomaly selection (e.g. "TCP retransmission detection") and uses this selection to enable processing or anomaly detection within the Expert Protocol Interpreter 410. In addition, the probe manager 412 also launches or applies the adaptive filter 406 to the frame manager 402 to insure that the frame manager 402 accepts only frames containing the given protocol supported by the probe 414 to be processed by the Expert Protocol Interpreter 410.

The probe 414 includes a function, or group of functions (i.e. heuristics), that are a subset of the Expert Protocol Interpreter 410 and whose intent is to discover and track anomalies for which the probe 414 was designed. For example, if the probe 414 is designed to detect a network complaint such as "TCP Retransmission" and is currently activated within the Expert Protocol Interpreter 410, it would receive an inbound "super frame" 408 as allowed from the frame manager 402, and examine the super frame 408 for the defect specific to the fault. If faulty, the probe 414 issues an alarm to the user via an alarm manager 416. The probe 414 can use the content of the super frame 408 including the protocol list header to reduce the need to re-parse the frame for lower layer general detail.

The adaptive filter 406 is a "filter mask" which includes a bit-pattern and heuristic to be used in a pattern match algorithm of the frame manager 402 as applied to the incoming frames 404. In addition, the adaptive filter 406 also contains an identifier which is used to select the Expert Protocol Interpreter 410 to be used to further process the frame 404. If the frame 404 passes the filter criteria, it is then passed to the Expert Protocol Interpreter 410 for further processing in the form of a super frame 408. Else, it is rejected with no further processing applied.

The Expert Protocol Interpreter 410 is a protocol specific set of heuristics used to parse an inbound super frame 408, gather frame-specific statistics, create network entity database objects (i.e. Expert network object 420) for storage and retrieval, provide anomaly detection and alarm issuance, and launch other lower or peer layer Expert Protocol Interpreters 410a. It should be noted that the Expert Protocol Interpreter 410 manages a set of all probes 414 specific to a given network protocol.

Figure 5:
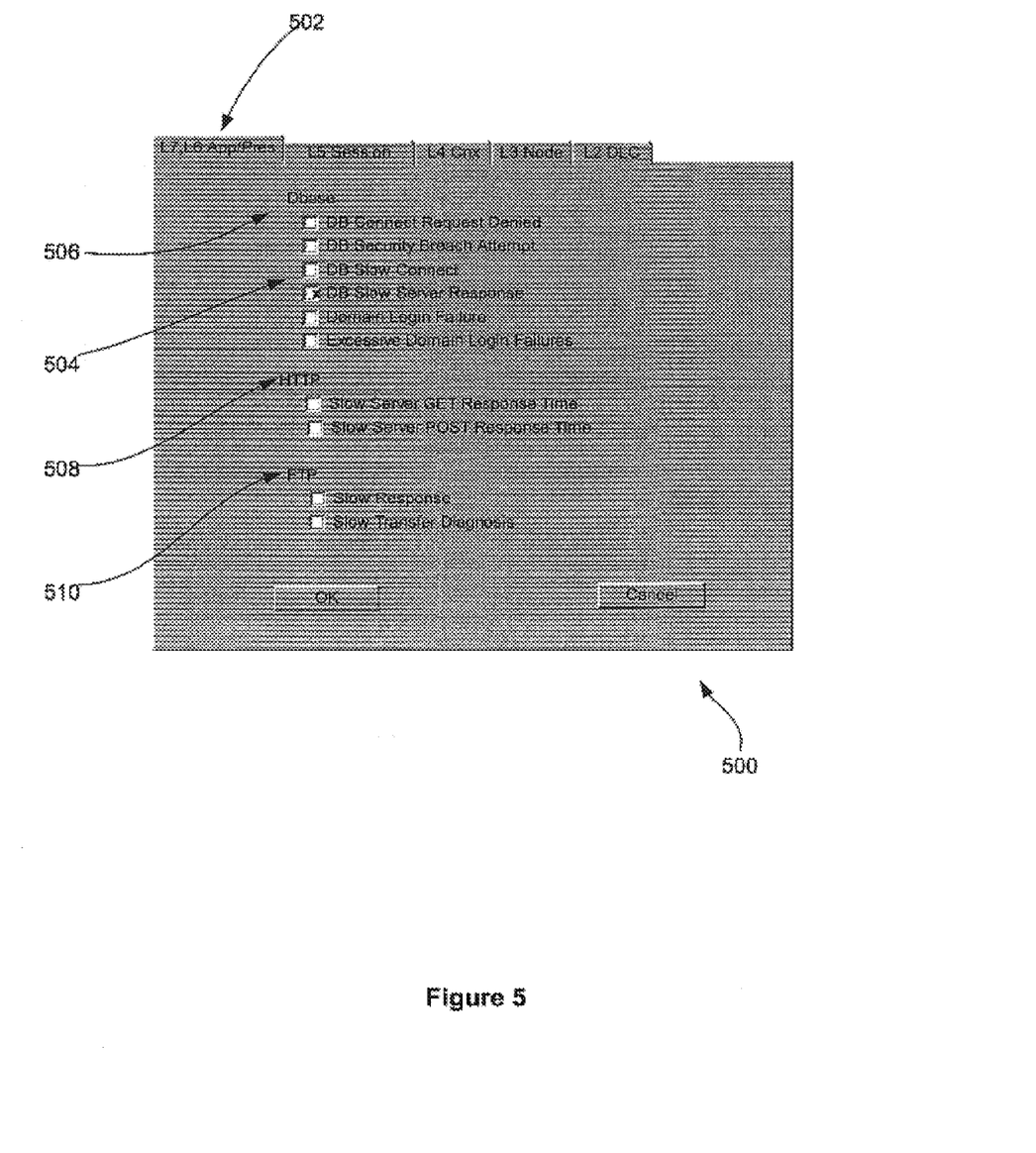
FIG. 5 illustrates a graphical user interface for allowing a user to focus on a particular network condition.

FIG. 5 illustrates a graphical user interface 500 for allowing a user to focus on a particular network condition. As mentioned earlier, the system 400 is designed to detect anomalies limited to a subset of all detectable network problems. As such, a user is initially allowed to select such subset before frame processing begins.

As shown, the graphical user interface 500 includes a plurality of selectable tabs 502 each corresponding to a particular network communications protocol layer. Each of such tabs, in turn, corresponds to a plurality of network faults or problems each represented by selection boxes 504 that are displayed upon the selection of the corresponding tab 502. As shown, the selection boxes 504 may be categorized into a plurality of groups of problems of various types. Such categories may include but not be limited to, a database category 506, a hypertext transfer protocol (HTTP) category 508, and a file transfer protocol (FTP) category 510.

During use, the user may be allowed to select the network communication protocol layers and the faults utilizing the graphical user interface 500. In particular, such graphical user interface 500 may be adapted for allowing a user to select from a plurality of network communication protocol layers associated with the communications over the network utilizing the tabs 502. Further, the graphical user interface 500 may be adapted for allowing the user to select from a plurality of faults associated with the communications over the network utilizing the selection boxes 504. In use, the adaptive filters 406 and probes 414 are capable of being constructed based on the user selections.

An exemplary case scenario will now be set forth as to how the graphical user interface 500 may be utilized. A user may initially notice that database access is extremely slow. Since database operations are based on the protocols found at layer 7 of the OSI model, the layer 6/7 menu tab 502 may be selected and the probe labeled "DB Slow Server Response" may be selected using the corresponding selection box 504.

In response to the user selection, the probe manager 412 may perform several actions such as initiating the probe process specific to the selected complaint, and sending a message to the frame manager 402 to allow only those network protocol frames that are relevant to the alarm in question to be passed to the probe 414 for processing via the Expert Protocol Interpreter 410. On a network segment with a large number of conversations (via applications) and network node pairs communicating, the present embodiment reduces the data set that must be processed to those frames (communications) that are relevant to the user-selected problem. The selective nature of the frame manager 402 is driven by the set of adaptive filters 406 that the frame manager 402 applies to the data stream. More information will now be set forth regarding the foregoing process.

Figure 6:
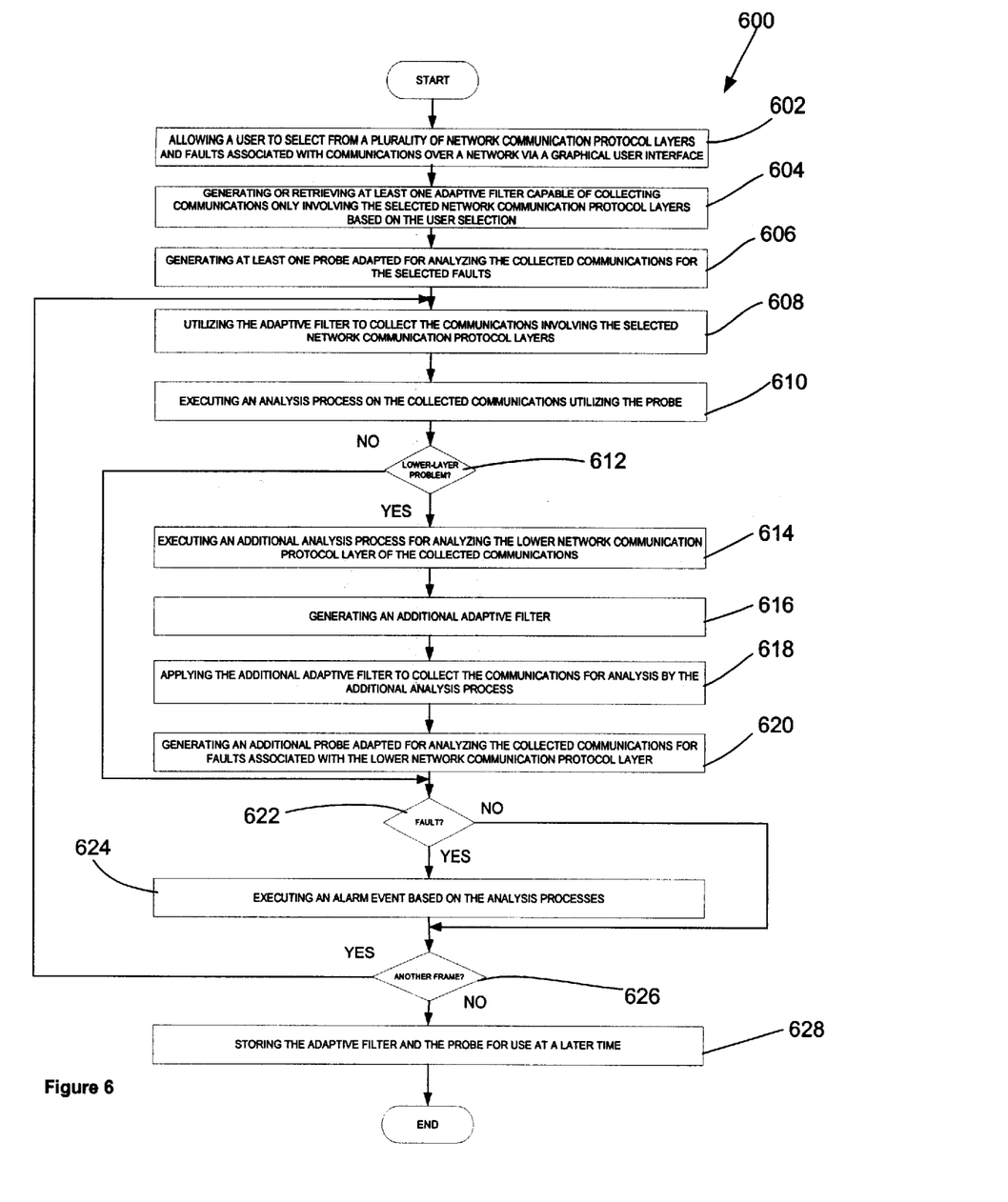
FIG. 6 illustrates a method for adaptively filtering communications and performing a top-down analysis on network communications.

FIG. 6 illustrates a method 600 for adaptively filtering communications and performing a top-down analysis on network communications. It should be noted that the present method 600 may be carried out in the context of the system 400 or any other architecture desired.

Initially, in operation 602, a user is allowed to select from a plurality of network communication protocol layers associated with communications over the network. Further, the user may be allowed to select from a plurality of faults associated with communications over the network. As an option, the graphical user interface 500 may be used to allow such user selection. Of course, any other input mechanism may be used per the desires of the user.

In operation 604, the adaptive filter 406 is generated which is capable of collecting communications only involving the selected network communication protocol layers. Further, in operation 606, the probe 414 may be generated for analyzing the collected communications for the selected faults. Of course, the generation of the adaptive filter 406 and/or probe 414 may include the retrieval of a preexisting adaptive filter 406 and/or probe 414, constructing the same from scratch, or any other technique of providing the adaptive filter 406 and probe 414.

A frame-by-frame analysis is then begun at this point in operation 608. In particular, an analysis process is executed in operation 608 by the Expert Protocol Interpreter 410 for analyzing information at the selected network communication protocol layers of the collected communications for the detection of faults. It should be noted that the collected communications are then analyzed only for the selected faults utilizing a plurality of the probes 414.

In particular, the adaptive filter 406 is used in operation 608 to collect the communications involving the selected network communication protocol layers. For example, the adaptive filter 406 is used such that a certain bit pattern at a given location in the network frame must match in its entirety, or the probe 414 will not process the frame. In this case, frames 404 that have content unrelated to the issue being processed are simply ignored (dropped). This bit pattern mask is sent to the frame manager 402 by the probe manager 412 once the probe 414 is initiated. The frame manager 402, in turn, inserts such adaptive filter 406 into a list of all active adaptive filters 406 which are to be applied to the frames 404.

In operation 610, the analysis process performs several key functions in conjunction with the probes 414. In particular, the contents of each network frame are parsed to derive and store frame relevant statistics into a keyed memory area for later retrieval and update purposes. Integrity of the frame is then verified and if fault is found, the Probe 414 sends a message to the alarm manager 416 which in turn issues an alarm to the user. The analysis process further correlates multi-frame contents for the purpose of transaction (state) verification, and issue alarms for transaction failures.

It is likely that the problem detected by the probe 414 at the current layer is related to problems that exist at an underlying or lower layer in the OSI model. For example, a probe 414 that detects a "DB Slow Response" condition may determine, based on the heuristics built into the probe 414, that such is probably caused by the lower layer protocol used to carry the DB-specific transaction and data frames. In response, the current probe 414 at the current layer may issue a command to the probe manager 412 to launch additional probes 414 at the appropriate peer or lower layer to detect possible causes which may have resulted in the current layer problems. By this design, the present method 600 employs a "top-down" protocol layer analysis process. More information will now be set forth on such top-down approach.

During the analysis process, it may be determined in decision 612 whether a problem exists at a lower one of the network communication protocol layers. This determination may be made based on heuristics, or any other technique of identifying problems at lower network communication protocol layers. If such problem exists, the additional analysis process may be executed by an additional Expert Protocol Interpreter 410a for analyzing information at the lower network communication protocol layer of the collected communications for the detection of faults specific to such layer. See operation 614. It should be noted that the additional analysis process may also be governed by heuristics or other rule-based analysis. In the alternative, the user may also selectively configure such analysis at least in part.

As an option, an additional adaptive filter 406 may be generated in conjunction with the additional analysis process. See operation 616. Such additional adaptive filter 406 may be applied in operation 618 to collect the communications for analysis by the additional analysis process. In particular, the additional adaptive filter 406 is adapted to collect the communications only involving the lower network communication protocol layer. As an option, in operation 620, further probes 414 may be generated for use by the additional analysis process. Again, the generation of the additional probes 414 may include a simple retrieval of an existing probe 414 or the construction thereof, based on heuristics or any other rule-based selection process.

It should be noted that the launching of lower layer probes and likewise associated adaptive filters provides a focusing effect (i.e. a narrowing of analysis) via several properties. For example, the newly applied adaptive filters 406 handle only certain (relevant) protocols which means that network frames 404 which do not include such protocols are dropped from analysis, thus keeping the analysis bandwidth requirements to a minimum.

Further focusing can be achieved by limiting the accepted frames 404 to a sub set which includes those frames which pass the probe protocol test and those which only involve the network entities whose conversation is suspect. It should be understood that most conversations detected on a network segment occur between two endpoints. Each endpoint has one or more addresses associated with it. These addresses can be used as part of the adaptive filter 406 associated with a probe 414 along with the bit-pattern used to distinguish one protocol from another (at the same layer). Put simply, if the original problem found at layer n between stations A and B launches probes at layer n-1, the adaptive filter keys would include the protocols to be examined at layer n-1 and only those conversations between endpoints A and B.

With continuing reference to FIG. 6, during the analysis processes, it is determined whether a fault or network communications "problem" has occurred. Note decision 622. Further, in operation 624 an alarm event may be executed based on the analysis process. It is then determined whether another frame has been received from the frame manager 402 for being included in the present frame-by-frame analysis. If so, the method 600 continues at operation 608.

Finally, the adaptive filter 406 and optionally the probe 414 may be stored for use at a later time. See operation 628. Following the completion of a frame analysis session it might be desirable for the user to re-apply the same set of adaptive filters 406 synthesized during the current session to other sessions on the same or different network segment. In other words, the analysis session may have resulted in the detection of problems at several network layers and yields the adaptive filter set specific to the problem set. It is likely that this is a chronic problem in the network and exhibits the same symptoms at several points of the network. Rather than start the analysis from scratch, the user can simply retrieve the desired filters set from non-volatile memory and apply it to the frame manager 402. The probe set 414 that had created the filter 406 could be archived along with the adaptive filter 406 to later be front loaded by the probe manager 412 along with the adaptive filter set in an effort to save process initialization time.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for filtering and analysis of communications over a network, comprising:

(a) allowing a user to select from a plurality of network communication protocol layers and addresses associated with communications over a network via a graphical user interface;

(b) allowing the user to select from a plurality of the faults associated with the communications over the network via the graphical user interface;

(c) generating at least one adaptive filter capable of collecting communications only involving the selected network communication protocol layers and addresses based on the user selection;

(d) generating at least one probe adapted for analyzing the collected communications for the selected faults;

(e) utilizing the adaptive filter to collect the communications involving the selected network communication protocol layers;

(f) executing an analysis process for analyzing information at the selected network communication protocol layers of the collected communications for the detection of faults utilizing the probe;

(g) storing the adaptive filter for use at a later time via the graphical user interface;

(h) determining whether a problem exists at a lower one of the network communication protocol layers based on computer-implemented heuristics utilizing the analysis process;

(i) initiating an additional collection and analysis process for analyzing the lower network communication protocol layer of the collected communications if it is determined that a problem exists at a lower one of the network communication protocol layers, wherein an efficiency of the analysis is improved by only performing top layer network communication protocol layer collection and analysis and avoiding the additional collection and analysis process at lower network communication protocol layers when it is unnecessary as determined by the computer-implemented heuristics;

(j) generating an additional adaptive filter associated with the additional analysis process;

(k) utilizing the additional adaptive filter to collect the communications for analysis by the additional analysis process;

(l) generating an additional probe adapted for analyzing the collected communications for faults associated with the lower network communication protocol layer; and (m) executing an alarm event based on the analysis processes;

(n) wherein a plurality of the adaptive filters is generated, and the graphical user interface allows a user to select the faults by:

(i) organizing each of the faults to be associated with a category of at least one network communication protocol layer, (ii) further organizing each of the faults to be associated with a sub-category of at least one protocol specific to the at least one network communication protocol layer associated with the corresponding category, (iii) listing the faults with the associated category and sub-category, wherein each fault has an associated selection field, (iv) allowing the user to identify the faults by the associated category and sub-category, and (v) allowing the user to select the faults based on the identification, utilizing the associated selection field.

2. The method as recited in claim 1, wherein the analysis process involves matching bit patterns with the collected communications.

3. The method as recited in claim 1, wherein the sub-categories relate to: a database sub-category, a hypertext transfer protocol (HTTP) sub-category, and a file transfer protocol (FTP) sub-category.

* * * * *